May 26, 1964

A. E. EVENSON 3,134,943

EXPANDED-SCALE TACHOMETER HAVING A SCALE TO
INDICATE DEVIATION FROM A SELECTED SPEED

Filed July 31, 1959

INVENTOR.
Arthur E. Evenson
BY
Oome, McDougall, Williams & Hersh
Attorneys

United States Patent Office 3,134,943
Patented May 26, 1964

3,134,943
EXPANDED-SCALE TACHOMETER HAVING A SCALE TO INDICATE DEVIATION FROM A SELECTED SPEED
Arthur E. Evenson, Rolling Meadows, Ill., assignor to American Gage & Machine Company, Chicago, Ill., a corporation of Illinois
Filed July 31, 1959, Ser. No. 830,936
3 Claims. (Cl. 324—70)

This invention relates to tachometers and is in particular directed to apparatus which may be readily incorporated in a portable test instrument and employed to provide a direct indication of the operating speed of internal-combustion engines such as are commonly used in motor vehicles.

One important object of the present invention is to provide a tachometer which, when connected electrically to the ignition system of an engine, will directly indicate engine speed without the necessity for any mechanical connection to the engine crankshaft. While devices broadly capable of achieving that object are known in the prior art, the present invention has a number of important advantages over prior-art instruments intended for the same purpose.

For one thing, my invention is inherently of the expanded-scale type, wherein the full range of the indicating scale is used to display the speed range which is of interest, rather than showing on the scale the entire range of speed from zero to some selected upper limit.

A further advantage of the present invention over prior-art devices intended for the same purpose is that my tachometer may be used to indicate deviation from a selected norm or base speed with an accuracy of indication that is independent of the base speed selected.

Still another significant advantage of my invention over devices of the prior art is that its accuracy of indication at the selected base frequency is not dependent upon either the meter sensitivity or the voltage of the internal battery. In this respect, my invention contrasts most favorably with prior-art devices, wherein both of the above-noted factors have a direct influence at all frequencies.

Further important advantages of my invention reside in its ready adaptability to various types of indication. Thus, for example, my tachometer can readily be used to indicate (a) absolute speed or frequency in r.p.m. or other desired units, or (b) to indicate absolute deviations from a selected base speed, again in r.p.m. or such other units as may be convenient, or (c) to indicate deviations from a selected base speed in terms of percentage change.

The foregoing and other objects and advantages of the invention will be apparent from the following description of a typical embodiment thereof.

Figure 1:
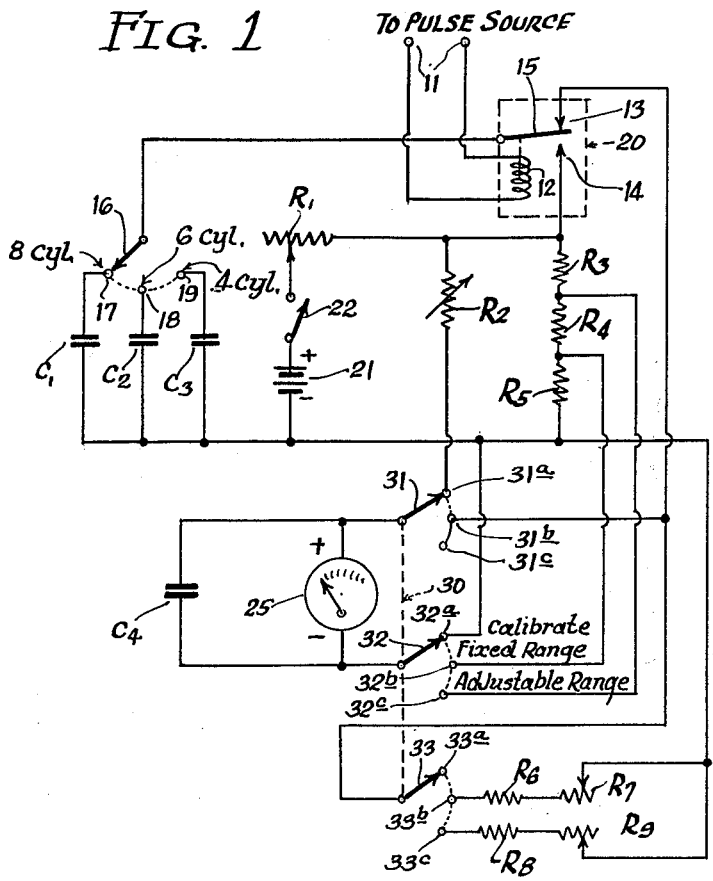
Figure 2:
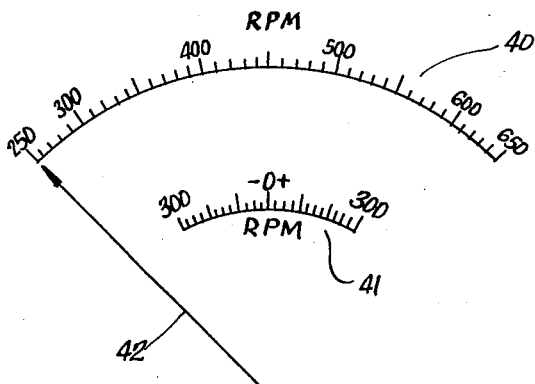

In the appended drawing, FIG. 1 is a schematic diagram of a typical tachometer embodying my invention, and FIG. 2 is a diagrammatic showing of a typical meter scale suitable for use with the instrument of FIG. 1.

By way of general background to assist in an understanding of the operation of my tachometer, it should be explained that a very useful application for tachometers is in the testing and adjustment of automobile and truck engines.

In making tests and adjustments on such engines, a tachometer is useful in a number of ways. In analysis of engine operation, as to timing, cylinder firing, carburetor adjustment, and the like, it is often desirable to operate the engine at an accurately measured low speed of a few hundred r.p.m. For this purpose, it is highly advantageous to have a direct-reading tachometer that will indicate engine speeds between about 250 r.p.m. and 650 r.p.m.

Additionally, for various other types of engine analysis, it is often desirable to be able to read deviations in speed from a pre-established base value or norm, in order to note accurately the effect on engine speed of various adjustments, such as quantity of fuel, fuel-air mixture, and so on. In tests of the last-mentioned type, knowledge of the absolute speed is generally less important than accurate determination of speed changes introduced by variations in operating conditions.

As is well known, a fixed ratio exists, in any internal-combustion engine of the ignition type, between the ignition firing rate and the crankshaft speed. In a typical four-cycle gas engine, each cylinder fires once for every two revolutions of the crankshaft. Hence, for an eight-cylinder engine, there will be four sparks per shaft revolution and the firing rate in sparks per minute will be four times as great as the shaft speed in revolutions per minute. For a four-cylinder engine of the same type, the ratio is only half as great—i.e., the ignition firing rate in sparks per minute is double the speed in revolutions per minute. In the case of a six-cylinder four-cycle engine, the firing rate is three times as great as the shaft speed, in the same units as above noted.

Thus it is quite convenient to use the electric pulses appearing on the primary side of the ignition circuit as a measure of engine speed for tachometer purposes. In my invention, that procedure is followed, such current pulses being normally applied to the input terminals 11 by connecting such terminals directly across the engine's breaker points. With such a connection, the engine's battery voltage is applied across the input terminals 11 whenever the circuit between the breaker points is open, and the terminals 11 are of course shorted out during the periods in which the breaker points are closed.

Connected across the input terminals 11 is the coil 12 of a high-speed single-pole double-throw relay, generally designated on the drawing with the numeral 20. The fixed contacts of relay 20 are respectively designated 13 and 14, and the movable arm is designated 15. The arm of relay 20 is so biased that the arm 15 is in electrical engagement with contact 13 during the periods between applied pulses, the occurrence of a current pulse through the coil 12 being ooperative to pull arm 15 away from contact 13 and into engagement with contact 14 during the duration thereof.

My tachometer is provided with a three-position single-pole manual switch designated by the reference numeral 16, specifically denoting its movable arm. The three contacts of the switch 16 are marked with the numerals 17, 18, and 19 respectively. For reasons presently to be explained, the manual actuating means for the switch 16 may, in a typical application of my tachometer, be provided with suitable indicating legend by which the respective switch positions are designated "8-cyl.," "6-cyl.," and "4-cyl." The respective switch contacts 17, 18, and 19 are each connected to one terminal of a capacitor, the respective capacitors being designated $C_1$, $C_2$, and $C_3$, $C_1$ being the capacitor associated with the 8-cyl. position, $C_2$ being associated with the 6-cyl. position, and $C_3$ being associated with the 4-cyl. position. The other terminals of the three capacitors just mentioned are connected together and in turn are connected to the negative terminal of a battery 21. The positive terminal of battery 21 is connected through a suitable off-on switch 22 to one terminal of a variable resistor $R_1$. The other terminal of resistor $R_1$ is connected to terminal 14 of relay 20. Terminal 14 of relay 20 is also connected to one side of a series circuit comprising resistors $R_3$, $R_4$, and $R_5$, the other end of such series circuit being returned to the negative terminal of the battery 21.

The indicating element of my tachometer is a conventional D'Arsonval meter 25, the respective terminals of which are connected to arms 31 and 32 of a three-pole three-position manual switch generally designated with the numeral 30. Each of the movable arms 31, 32, and 33 of the switch 30 has three associated fixed contacts which are designated by reference numerals 31a, 32a, etc. The three positions of switch 30 may be designated on the instrument panel with legends identifying them as the "calibrate" position, the "fixed range" position, and the "adjustable range" position, respectively.

Arm 33 of switch 30 is connected to contact 13 of relay 20 and is also connected to terminals 31b and 31c of switch 30.

A variable resistor $R_2$ is connected between terminal 14 of relay 20 and terminal 31a of switch 30. Terminal 32a of switch 30 is connected to the negative terminal of battery 21. Terminal 32b of switch 30 is connected to the junction of resistors $R_4$ and $R_5$. Terminal 32c of switch 30 is connected to the junction of resistors $R_3$ and $R_4$.

Terminal 33a is open. Terminal 33b is connected to the negative terminal of battery 21 through a series circuit comprising a fixed resistor $R_6$ and a variable resistor $R_7$. Terminal 33c of switch 30 is likewise connected to the negative terminal of battery 21 through a series circuit comprising a fixed resistor $R_8$ and a variable resistor $R_9$.

Variable resistors $R_1$ and $R_9$ are manually adjustable from the panel of the instrument since, as will presently be explained, the operator of the instrument has occasion to adjust them in the normal operation of the tachometer. Variable resisors $R_2$ and $R_7$ are preferably situated inside the housing of the instrument where they are not readily available to the operator, since they are initially adjusted at the factory and do not normally need further attention during operation of the instrument.

The meter 25 is shunted by a large damping capacitor $C_4$.

While the values of the various circuit elements employed in my tachometer may vary over a wide range, depending on the specific application of the device, typical values of these circuit elements may be in accordance with the following table:

| | | |
|---|---|---|
| $C_1$ | mf | 2.2 |
| $C_2$ | mf | 2.9 |
| $C_3$ | mf | 4.4 |
| $C_4$ | mf | 250 |
| $R_1$ | ohms | 125 |
| $R_2$ | do | 25,000 |
| $R_3$ | do | 200 |
| $R_4$ | do | 100 |
| $R_5$ | do | 100 |
| $R_6$ | do | 8,000 |
| $R_7$ | do | 3,000 |
| $R_8$ | do | 2,000 |
| $R_9$ | do | 5,000 |

In the typical embodiment using resistors and capacitors in accordance with the above table, the relay employed was one of the type which is commercially available and capable of operating at speeds up to 350 cycles per second. In the same instrument, the meter employed a D'Arsonval movement giving full-scale deflection on a current of 100 microamperes and having a coil resistance of about 900 ohms. The values given in the above table for the capacitors $C_1$, $C_2$, and $C_3$ represent nominal values. In practice, for a high degree of calibration accuracy, it is important that the capacitance values of those elements be adjusted so that $C_2$ is one-third larger than $C_1$ and $C_3$ is twice as large as $C_1$. To achieve this accurate proportioning of the capacitances, the nominal values above stated may be "padded" by shunting across them smaller capacitors of such size as may be needed to achieve the desired relationship.

*Operation*

In describing the operation of my invention, I shall first deal with the case where the speed of an eight-cylinder engine is being measured on the so-called "fixed range" of the instrument, i.e., the upper of the two scales indicated in FIG. 2. Under these conditions, the arm of switch 16 will be in engagement with fixed contact 17.

At the beginning of the operation, if my tachometer has not been used for some time, the switch 30 will first be placed in the "calibrate" position, and resistor $R_1$ will be adjusted until the pointer on the meter 25 reads full scale. (Resistor $R_2$ is adjusted at the factory to a value such that full-scale deflection of the meter 25 will occur at some intermediate position of the variable resistor $R_1$.) This calibration adjustment is merely to provide a definite value of voltage across the resistor circuit comprising $R_3$, $R_4$, and $R_5$ and is analogous to the zero adjustment normally made on an ohmmeter before measurements are made with it.

When the meter has thus been calibrated, the switch 30 is shifted to its intermediate or "fixed range" position, whereat the arm 31 is in engagement with contact 31b, etc.

When the input terminals 11 are connected across the breaker points of an operating ignition-type gas engine, the relay 12 is actuated once for each ignition spark. Since, in a typical engine, the "make" intervals are approximately equal in time duration to the "break" intervals, the arm 15 is in engagement with contact 13 approximately half the time and is in engagement with contact 14 approximately half the time, the time required for movement of the arm from one contact to the other being very small by comparison.

When the arm 15 is engaging contact 14, the capacitor $C_1$ charges quickly to the voltage across the resistor bank comprising $R_3$, $R_4$, and $R_5$. Since the quantity of resistance in the charging circuit is quite low, this charging operation requires only a few microseconds and is completed long before the arm 15 shifts over to contact 13. When the arm 15 engages contact 13, the capacitor $C_1$ discharges through the circuit comprising the meter 25. The discharge rate is likewise sufficiently rapid for the capacitor to become essentially discharged long before the relay arm 15 again moves into engagement with contact 14.

The foregoing series of events is repeated each time the relay 20 is actuated by current fed to the coil 12 which, as previously noted, occurs once for each ignition spark of the engine under observation. The result is a flow of current through the meter 25 in the direction tending to deflect the pointer upward. The meter by its mechanical inertia will tend to average the current impulses through it, and this effect is assisted by the electrical integrating action of capacitor $C_4$, which, after a number of cycles, will charge to a voltage representing the average IR drop across the meter coil and thereby maintain the current through the meter at a steady value, so long as the engine speed does not change.

The current through the meter 25 resulting from periodic discharges of the capacitor $C_1$ is opposed by a steady current in the opposite direction which flows through the meter M. The path of this current, in terms of conventional current direction, is from the positive terminal of battery 21 through $R_1$, $R_3$, $R_4$, contact 32b, switch arm 32, meter 25, switch arm 31, contact 31b, switch arm 33, contact 33b, and resistors $R_6$ and $R_7$, back to the negative terminal of battery 21.

By factory adjustment, the resistor $R_7$ is pre-set to a value such that this reverse current just described will exactly equal the average current driven through the meter in the forward direction by the successive discharges of capacitor $C_1$ when the engine speed is the minimum value indicated on scale 40 of the meter. In other words, when the engine under observation is operating at that minimum speed, which in the instrument shown in the drawing is 250 r.p.m., the actual net current through the meter 25 will be zero and the pointer 42 will accordingly be in its rest position.

As the engine speed increases, the average value of the current driven through the meter 25 in the forward direction by successive discharges of capacitor $C_1$ will increase in direct proportion. The opposing current in the backward direction, however, will not change with changes in engine speed. As a result, as the speed of the engine under observation increases above the minimum level, the pointer 42 will move to the right, indicating accurately on the scale the actual speed of the engine.

With the foregoing explanation in mind, skilled readers will readily understand why the various capacitors $C_1$, $C_2$, and $C_3$ are provided for engines of different numbers of cylinders. Since the actual number of charge-discharge cycles for a given engine speed will be only half as great in the case of a four-cylinder engine as for an eight-cylinder engine, it is of course necessary that the quantity of charge placed on the capacitor during each cycle be made twice as great. This is most readily accomplished by using a capacitor of double magnitude, and capacitor $C_3$ is hence made twice as large as $C_1$. By similar reasoning, the reader will at once grasp why the capacitor $C_2$ must be 4/3 the size of capacitor $C_1$ for a six-cylinder engine, and the manner of calculating the capacitance ratio for engines of other numbers of cylinders will likewise be apparent.

It is an interesting characteristic of my invention that the change of meter deflection resulting from a given change in engine speed is independent of the absolute value of the base speed, so long as the size of the capacitor is not changed. In other words, once my tachometer has been set for a base speed, a deviation therefrom of a given number of r.p.m. will produce a corresponding angular deflection of the indicating needle, no matter what the base speed may be. This property makes it convenient and desirable to provide, on tachometers embodying my invention, an alternative scale which is calibrated in terms of r.p.m. deviation from a base speed, rather than in terms of absolute engine speed. Such a scale is shown on FIG. 2 and marked with the reference numeral 41.

When the instrument is to be used with scale 41, the switch 30 is set at the "adjustable range" position, whereat arm 31 is in engagement with contact 31c, arm 32 is in engagement with contact 32c, and so on. Under these conditions, the variable resistor $R_9$, which is a panel control available to the operator of the instrument, may be so adjusted as to bring the needle 42 over the zero point on scale 41 for whatever engine speed is to be used as the norm or base speed. To extend the utility of the adjustable range setting, the range of resistance variation afforded by resistor $R_9$ is made great enough to provide a wide choice of base speeds. For the typical values given in the foregoing table, the instrument can be set, in the adjustable range position, for any base speed between perhaps 1500 r.p.m. and 4500 r.p.m. When, for a given engine speed, the indicating needle 42 has been brought over the zero point on scale 41 by means of resistor $R_9$, subsequent deviations from such base speed will register on the scale 41 in terms of absolute change of speed. Even though the actual base frequency may not be known, deviations therefrom can be accurately read.

It should also be noted that the base speed is not necessarily the one at which the actual current through the meter 25 is zero. Where it is desired to indicate variations in speed both above and below a base speed, the zero setting on the scale may be selected so as to represent some value of current through the meter 25 other than zero—e.g., a value of current that will provide a half-scale reading, illustrated by scale 41.

The calibration of the scale on the adjustable range setting will depend on the relative magnitudes of the resistors $R_3$, on the one hand, and $R_4$ and $R_5$ on the other. If $\Delta f$ represents a change in pulse frequency from the value characteristic of the base speed, and $\Delta Im$ represents the change in meter current resulting therefrom, the sensitivity of the circuit may be expressed by the equation:

$$\frac{\Delta Im}{\Delta f} = CE\left(1 - \frac{R_3}{R_3 + R_4 + R_5}\right)$$

where C is the value of the capacitance being employed and E is the voltage across the series circuit comprising $R_3$, $R_4$, and $R_5$. Since C, E, $R_3$, $R_4$, and $R_5$ are all constant, it will be apparent that variation of $R_9$, which determines the base speed in the adjustable range setting, will not affect the scale calibration but will merely determine the base speed for which the scale 41 reads zero. Thus scale 41 can be initially calibrated in accordance with the values chosen for the various parameters in the above-stated formula, and it will remain accurate for any value of base speed that may be selected by adjustment of $R_9$.

The base speed thus selected is proportional to the quantity $$\frac{P}{C(R_6 + \overline{R_7})(1-P)}$$

where P equals the ratio $$\frac{R_5}{R_3 + R_4 + R_5}$$

Thus the base speed is not dependent on either the battery voltage or the meter sensitivity.

From the formula above stated, skilled readers will note that the sensitivity of the circuit—i.e., the amount of meter deflection resulting from any given change in pulse rate—is directly proportional to the value of C. This property of my circuit is employed in the provision of the switching arrangement adapting it to engines having a different number of cylinders. Thus, if the speed of a four-cylinder engine is being observed, the actual change in pulse rate resulting from a given change in crankshaft speed is only half as great as for an eight-cylinder engine. If the scale of the tachometer is calibrated in crankshaft speed, which is the case in the illustrative scales shown in FIG. 2, then a faithful calibration is maintained for engines of differing numbers of cylinders merely by switching in capacitors of appropriate sizes.

Stated in a more general manner, this last-mentioned property of my circuit provides the means for producing a tachometer in which the indicating meter is deflected in proportion to a given percentage change in pulse rate. This is accomplished by adjusting the magnitude of the capacitor to produce zero meter current at such particular base frequency as may be desired. Once this has been done, changes in the pulse rate will be reflected on the meter in terms of percentage change from the base, rather than from absolute change. This is, in effect, achieved in the illustrated embodiment by the provision of three different capacitors for use with the scale 40. When the switch 16 is in the eight-cylinder position, the number of pulses fed to the relay coil 12 via input terminals 11 is four times as great as the indicated number of r.p.m. shown on the scale. In other words, while the scale is marked off between a pair of selected values, such as 250 r.p.m. and 650 r.p.m., the actual pulse rates corresponding to those speeds, for an eight-cylinder engine, are 1,000 p.p.m. and 2,600 p.p.m. Now suppose it is desired to measure the speed of a four-cylinder engine. Under these conditions, the pulse rate for the same crankshaft speeds is only half as great—i.e., the pulse rates corresponding to 250 r.p.m. and 650 r.p.m. are respectively 500 p.p.m. and 1,300 p.p.m.

Note that while the absolute frequency span indicated in the eight-cylinder case is 1,600 r.p.m., and in the four-cylinder case is only 800 r.p.m., the percentage difference between the pulse rates corresponding to minimum and maximum meter deflection is the same in both cases—namely, 160 percent.

From the foregoing, the skilled reader will understand that a designer wishing to use my invention for actual indication of percentage differences in speed, rather than actual speed values, could calibrate the scale 40 in terms of percentage change, with zero percent being marked off at the position corresponding to zero meter current. If the base speed desired were some speed other than those readily obtainable with a small number of fixed capacitors, adaptation of the instrument to other base speeds could be achieved merely by providing a position for switch 16 adapted for connection of an external variable capacitor, such as the familiar decade box. By that means, any desired base speed—i.e., pulse frequency—within a wide range could be selected, and the calibrated percentage scale would show percentage deviation from that base speed, whatever it might be.

Many modifications of the illustrated circuit will occur to readers skilled in the art. Thus, for example, the mechanical relay 20 could be replaced in many applications with electronic devices adapted to perform similar functions. Further, while I have described my instrument in connection with its application as an engine tachometer, the instrument obviously possesses utility in connection with measurement of the frequency of periodic pulse trains from other sources than engines.

As a still further modification, skilled readers will realize that taking pulses from the ignition system of an engine for purposes of tachometry is merely a convenience. With other types of rotating machinery, such as diesel engines and electric motors, a suitable source of pulses for tachometry may be a cam-operated switch driven by the engine, or an electronic or optical equivalent thereof.

Still other modifications and departures from the disclosed structure will be apparent to skilled readers of this specification, and it is accordingly my desire that the scope of my invention be determined primarily by reference to the appended claims.

I claim:
1. An expanded-scale tachometer adapted to indicate deviation in speed of an electric-ignition internal-combustion engine, said tachometer being provided with two calibrated scales, one of which is calibrated to indicate engine speed throughout a predetermined range which does not include zero speed, and the other of which is calibrated to show relative speed with respect to a base speed selectable by the operator, comprising input means adapted to be connected to the ignition system of such engine and to derive therefrom a train of electric pulses, each pulse of said train representing the firing of a single cylinder of such engine, automatic switching means connected to said input means and fed by said pulse train, said switching means providing therethrough first and second current paths, one of said paths being completed during the respective durations of said pulses and the other of said paths being completed during the time intervals between said pulses, a D.-C. voltage source, a charge-storage means comprising at least one capacitor, an indicating meter responsive to average direct current therethrough, the time constant of the response of such meter being several times greater than the greatest interval between pulses in said train, first circuit means comprising one of said current paths and interconnecting said voltage source and said storage means operative to charge said storage means to a predetermined voltage each time said last-mentioned current path is completed, second circuit means interconnecting said storage means and said meter and comprising the other of said current paths, operative to discharge said capacitor through said meter each time said other current path is completed, and third circuit means interconnecting said voltage source and said meter operative continuously to drive direct current through said meter in the direction opposite to that of said discharge current, said third circuit having two branches and a switching means, either of said branches being selectable at will by manual actuation of said switching means, one of said branches comprising a variable resistor adjustable to vary the magnitude of said direct current to the appropriate value to provide accurate speed indication on said first-mentioned scale and the other of said branches comprising a variable resistor available to the operator, manual adjustment thereof being effective to vary the magnitude of said direct current and thereby to change within predetermined limits the base speed for use with said second calibrated scale.

2. The tachometer defined in claim 1 wherein said charge-storage means comprises a bank of at least three capacitors and switching means connected thereto operative on manual actuation to change the net effective capacitance of said storage means to any selected one of three values, one of said capacitance values being substantially double that of the smallest of said three values, and the remaining one of said three capacitance values being substantially equal to four-thirds of the smallest of said three values.

3. An expanded-scale tachometer adapted to indicate deviation in speed of an electric-ignition internal-combustion engine, having two calibrated scales, one of which is calibrated to indicate engine speed throughout a predetermined range which does not include zero speed, and the other of which is calibrated to show relative speed with respect to a base speed selectable by the operator, comprising sensing means adapted to be connected to the ignition system of such engine and operative to derive therefrom a direct current having an average value proportional to the speed of such engine, an indicating meter responsive to the average current therethrough, said meter having an indicating pointer positioned for cooperation with said aforementioned calibrated scales and being fed by the current from said sensing means, a D.-C. voltage source, and circuit means interconnecting said voltage source and said meter operative continuously to drive steady current from said voltage source through said meter in the direction opposite to that of said current from said sensing means, said circuit means having two branches and a switching means, either of said branches being selectable at will by manual actuation of said switching means, one of said branches comprising a variable resistor adjustable to regulate said steady current to provide accurate speed indication on said first-mentioned calibrated scale and the other of said branches comprising a variable resistor available to the operator, manual adjustment thereof being effective to change the magnitude of said steady current and thereby to change within predetermined limits the base speed for use with said second calibrated scale.

References Cited in the file of this patent

UNITED STATES PATENTS

| | | |
|---|---|---|
| 2,108,014 | Jones | Feb. 8, 1938 |
| 2,473,542 | Philpott | June 21, 1949 |
| 2,502,712 | Floyd | Apr. 4, 1950 |
| 2,598,874 | Agin | June 3, 1952 |
| 2,617,083 | Petroff | Nov. 4, 1952 |
| 2,629,008 | Lynch et al. | Feb. 17, 1953 |
| 2,743,417 | Hollmann | Apr. 24, 1956 |
| 2,887,654 | Strassman et al. | May 19, 1959 |

OTHER REFERENCES

Transistor Frequency Meters, by L. R. Blake, et al., article in Electronic Engineering, August 1956; pages 322–327.